United States Patent [19]

Bock et al.

[11] Patent Number: 4,920,261
[45] Date of Patent: Apr. 24, 1990

[54] BIREFRINGENT OPTICAL FIBER DEVICE FOR MEASURING OF AMBIENT PRESSURE IN A STABILIZED TEMPERATURE ENVIRONMENT

[75] Inventors: Wojtek J. Bock, Gloucester, Canada; Andrzej W. Domanski, Warszawa, Poland

[73] Assignee: Universite Du Quebec A Hull, Hull, Canada

[21] Appl. No.: 356,244

[22] Filed: May 24, 1989

[51] Int. Cl.$^5$ ................................................. G02F 1/01
[52] U.S. Cl. ................................ 250/225; 250/227.17; 350/96.33
[58] Field of Search ................... 250/225, 227, 231 R, 250/231 P; 350/46.33; 356/35.5, 367; 73/705

[56] References Cited

U.S. PATENT DOCUMENTS

| | | | |
|---|---|---|---|
| 3,556,662 | 1/1971 | Levenstein et al. | 250/225 |
| 4,078,432 | 3/1978 | Stewart | 73/705 |
| 4,111,050 | 9/1978 | Waddoups | 250/225 |
| 4,372,646 | 2/1983 | Strahan et al. | 350/96.33 |
| 4,427,881 | 1/1984 | Ruell | 350/96.33 |
| 4,516,021 | 5/1985 | Taylor | 250/227 |
| 4,531,811 | 7/1985 | Hicks, Jr. | 350/96.33 |
| 4,634,858 | 1/1987 | Gerdt et al. | 250/227 |
| 4,642,458 | 2/1987 | Jackson et al. | 250/225 |
| 4,659,923 | 4/1987 | Hicks, Jr. | 250/227 |
| 4,740,078 | 4/1988 | Daendliker et al. | 356/35.5 |
| 4,770,492 | 9/1988 | Levin et al. | 350/96.33 |
| 4,781,424 | 11/1988 | Kawachi et al. | 350/96.33 |

OTHER PUBLICATIONS

High Pressure Fiber—Optic Sensor With Side—Hole Fiber, K. Jansen et al., SPIE, vol. 798, Fiber/Optic Sensors II (1987), pp. 56–60.
Polarimetric Strain and Pressure Sensors Using Temperature—Independent Polarization Maintaining Optical Fiber, Y. Kikuchi et al., pp. 395–398.
Elliptical Core Two—Mode Fiber Strain Gauge, J. N. Blake et al., SPIE, vol. 838, Fiber Optic and Laser Sensors V (1987), pp. 332–339.
Side—Hole Fiber For Fiber—Optic Pressure Sensing, H. M. Xie et al., May 1986, vol. II, No. 5, Optics Letters, 1986, Optical Society of America, pp. 333–335.
Polarimetric Strain Gauges Using High Bireference Fibre, Electronics Letters, 18th Aug. 1983, vol. 19, No. 17, pp. 669–700.

*Primary Examiner*—David C. Nelms
*Assistant Examiner*—Stephone B. Allen
*Attorney, Agent, or Firm*—Foley & Lardner, Schwartz, Jeffery, Schwaab, Mack, Blumenthal & Evans

[57] ABSTRACT

The present disclosure describes a birefringent optical fiber device for measuring of ambient pressure in a stabilized temperature environment, when connected respectively to a light source and a measuring apparatus. The device comprises a first device for receiving polarized light from the light source; a birefringent fiber being connected to the first device for receiving the polarized light which has light signal components polarized along two orthogonal polarization axes of the berefringent fiber, the berefringent optical fiber having a preselected length determined by a range of pressures to be measured; and a second device for receiving light signals emitted from the birefringent fiber, the light signals having elliptical polarization state characterized by major and minor axes, whereby cross-talk between the light signal components along the polarization axes being responsive to the ambient pressure in the environment.

11 Claims, 4 Drawing Sheets

BIREFRINGENT OPTICAL FIBER DEVICE FOR MEASURING OF AMBIENT PRESSURE IN A STABILIZED TEMPERATURE ENVIRONMENT

FIELD OF THE INVENTION

The present invention relates to a birefringent optical fiber device for measuring of ambient pressure in an environment, when the device is connected to a light source and a measuring apparatus.

BACKGROUND OF THE INVENTION

High hydrostatic pressure is now widely recognized as an important controllable environmental parameter both in industrial manufacturing technologies and in laboratory investigations. The proliferating variety of process control applications combined with increasing data transmission rates has resulted in the need for improved accuracy and reliability in pressure measurement. Other needs include compatibility with data transmission systems, multiplexing and demultiplexing of large sensor arrays, and both distributed and "smart" sensing. Although a wide choice of physical properties would seem to be available for use in sensing devices, most sensors currently in use depend ultimately on resistance, capacitance or frequency.

Sensors employing optical fibers have significantly greater sensitivity, are very small and can be configured in arbitrary shapes so they can penetrate into often inaccessible locations. They can sense nearly any physical perturbation and at the same time have inherent immunity to electromagnetic interference (EMI), which is an important feature in noisy industrial environments. Finally, fiber-optic sensors are intrinsically safe so they are well suited for electrically dangerous, hazardous or explosive environments including high-pressure and hightemperature conditions. By definition they are readily compatible with fiber-optic telemetry and optical data transmission systems. Possible applications include not only high-pressure laboratory measurement but also oil field and mining instrumentation and many general process-control and industrial manufacturing technologies.

One sensor has been reported so far in the publication entitled "HIGH PRESSURE FIBER-OPTIC SENSOR WITH SIDE-HOLE FIBER" by K. JANSEN et al., pages 56 to 60 of Proceedings of SPIE, vol. 798, Fiber Optic Sensors II (1987), with measurement characteristics provided for pressure up to about 70 MPa. The device is based on uniaxially induced elasto-optic birefringence occurring in side-hole optical fibers under hydrostatic stress conditions.

With conventional high-pressure sensors, a wide range of physical properties of different materials can be used as a basis for high-pressure sensing. Specific requirements for a practical device, however, such as sensitivity, thermal stability and lack of hysteresis severely limit this range to a few preferred phenomena. For measuring pressures up to about 1 GPa, sensors based on resistance, capacitance or frequency changes under pressure are most often used.

Resistance gauges using alloy materials such as manganin, gold-chromium or other 3d or 4f alloys are classical, with pressure coefficients ranging from $1 \cdot 10^{-5}$ $MPa^{-1}$ to $3 \cdot 10^{-5}$ $MPa^{-1}$. Pure or doped semiconductors or semiconductor devices such as light emitting diodes could also be included in this group, with pressure coefficients ranging from $8 \cdot 10^{-5}$ $MPa^{-1}$ to $4.4 \cdot 10^{-4}$ $MPa^{-1}$. Capacitance sensors are known to have good long-range stability with moderate pressure coefficients such as $5.9 \cdot 10^{-5}$ $MPa^{-1}$ for calcite. Ultrasonic gauges, based on resonance frequency shift under pressure in quartz or other crystals, were reported to have low pressure coefficients of about $4 \cdot 10^{-5}$ $MPa^{-1}$ and good accuracy, but because they are usually large and require techniques of ultrasonic interfereometry, they are more appropriate for laboratory experiments than for practical industrial applications.

Many fiber-optic low-pressure sensors were developed primarily as modifications of displacement or stress transducers using multi-mode technology. They are generally based on one of two principal ideas: the first uses fibers as waveguides to and from a bulk sensing element and the element itself changes its transmission properties under pressure; the second is based on using the fiber itself as a sensing element. Recently two phase-sensitive transducers were reported: in both cases the unilateral force depending on external pressure induces birefringence in low-birefringent fiber, as described in the publication entitled "HIGH RESOLUTION PHOTOELASTIC PRESSURE SENSOR USING LOW BIREFRINGENCE FIBER" by A. BERTHOLDS et al. Appl. Opt. vol. 25, pp 340-3 (1986) or in side-hole fiber, as described by K. Jansen. Induced birefringence, defined as a difference in propagation constants $\beta_x$ and $\beta_y$ for two principal polarization axes, increases with pressure and generates the output signal.

To date only the above mentioned paper of K. JANSEN has dealt with fiber-optic sensing of high pressure, i.e. pressure of at least 60-70 MPa. As a measured parameter, the authors used pressure-induced birefringence occurring in a side-hole single-mode fiber with a fixed length of 10 cm. The fiber was placed directly inside a pressure capillary and sealed at both ends with an epoxy resin. The output of this sensor, resulting from pressure-induced birefringence in a single-mode non-birefringent fiber having two circular cavities parallel to the core, was found to be a periodic function of pressure up to about 70 MPa. The period of the output signal, however, is only of about 0.8 MPa, and is therefore not well suited for measurement of higher pressures since calibration procedure of such a sensor would be unnecessarily difficult.

Also known in the art is a U.S. Pat. No. 4,740,078 by Rene DAENDLIKER et al., issued on Apr. 26th, 1988. In this patent, there is described method and apparatus for the measurement of force by the use of stressinduced birefringence in a single-mode optical fiber. In this case, the apparatus comprises, among other things, force-responsive means for laterally compressing a curved optical fiber portion, the force-responsive means including at least two parallel spaced pressure plates having planar adjacent surfaces on opposite sides of, and in engagement with, said optical fiber curved portion.

The apparatus of DAENDLIKER et al. is aimed at a goal different from the one of the present application. The apparatus of DAENDLIKER et al. measures the pressure along a specific axis, on the contrary, the present application describes an apparatus for measuring the ambient pressure in an environment. The apparatus of DAENDLIKER et al. is also different from the apparatus described in the present application in that it requires two parallel spaced pressure plates for compressing the curved optical fiber portion by which a pressure exerted along a specific axis, can be detected.

It is an object of the pressure invention to overcome certain drawbacks and limitations of high pressure sensors known in the art.

It is another object of the present invention to provide a birefringent optical fiber device for measuring high pressure, using a highly birefringent optical fiber, which device is economical to construct and easy to operate.

It is another object of the present invention to provide a birefringent optical fiber device adaptable to any pressure vessel or apparatus using a wide variety of high pressure medium such as gas or liquid.

It is another object of the present invention to provide a birefringent optical fiber device which is reuseable and which is capable of being rapidly assembled and disassembled in a body of a chamber or a connector.

It is another object of the present invention to provide a birefringent optical fiber device for measuring high pressure in explosive or harsh environments without using any electrical signals and eliminating in the same time the risk of electrical short-circuits in the system.

It is another object of the present invention to provide a birefringent optical fiber device for measuring any required range of pressures up to 200 MPa.

SUMMARY OF THE INVENTION

According to the present invention, there is provided a birefringent optical fiber device for detecting ambient pressure in a stabilized temperature environment, when connected respectively to a light source and a measuring apparatus, comprising:

first means for receiving polarized light from said light source, and transmitting said polarized light;

a birefringent optical fiber having a solid content, said birefringent fiber being connected to said first means for receiving said polarized light which has light signal components polarized along two orthogonal polarisation axes of said birefringent fiber, said birefringent optical fiber having a preselected length determined by a range of pressures to be measured, said polarized light being injected into said birefringent fiber in a direction parallel to a longitudinal axis of said birefringent fiber, said birefringent fiber being adapted to be submitted to said environment; and second means for receiving light signals emitted from said birefringent fiber, said light signals having elliptical polarization state characterized by major and minor axes, whereby cross-talk between said light signal components along said polarization axes being responsive to said ambient pressure in said environment, said measuring apparatus detecting said light signals from said second means to provide an output signal indicative of said ambient pressure.

The objects, advantages and other features of the present invention will become more apparent upon reading of the following non restrictive description of preferred embodiments thereof, given for the purpose of examplification only with reference to the accompanying drawings.

DETAILED DESCRIPTION OF THE DRAWINGS

The operating principle of the present birefringent optical fiber device is based on the effect of polarization coupling under the influence of pressure that occurs in birefringent optical fibers and more particularly in highly birefringent optical fibers. Such fibers, developed specially for coherent communication systems and for interferometric sensing methods, are able to maintain the linear polarization state of the light injected into them. However, the polarization is preserved only if the linear polarization state is parallel to one of two orthogonal principal axes of the fiber. These axes are characterized by two different propagation constants $\beta_x$ and $\beta_y$. In the configuration of polarization of the present birefringent fiber device, the light is injected, for example, at 45° to the principal axes of the highly birefringent fiber and consequently the actual polarization state rotates along the direction of lightwave propagation through the fiber. The repetition distance between two consecutive points of equal phase is referred to as the beat length parameter of the fiber.

This beat length, previously considered to be dependent only on temperature, strain or unilateral stress, varies under high pressure enough to produce a significant change of the polarization state of the output signal due to phase shift between two "x" and "y" electric field components of the light guided by the fiber. The output signal, monitored at the received end of the fiber in the direction perpendicular to the direction of the major axis of the generally elliptical polarization state is directly dependent on high hydrostatic pressure applied externally to the birefringent fiber device.

Figure 1:
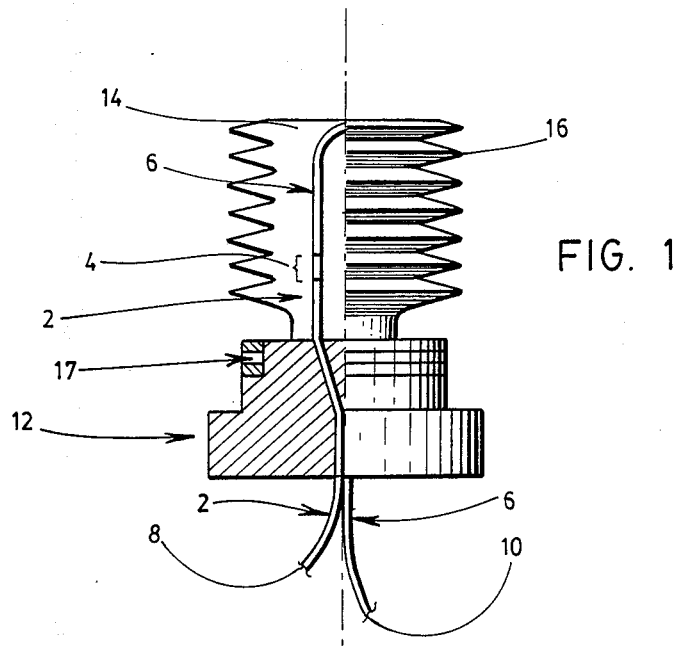
FIG. 1 is a side view partially in cross section of a birefringent optical fiber device according to the present invention.

Referring now to FIG. 1, there is shown a birefringent optical fiber device for detecting ambient pressure in a stabilized temperature environment, when connected respectively to light source (not shown) and a measuring apparatus (not shown). The birefringent optical fiber device comprises a first optical fiber 2 for receiving polarized light from the light source and transmitting it. The polarized light has light signal components polarized along two orthogonal polarization axes of the birefringent fiber.

The birefringent device also comprises a birefringent optical fiber 4 having a solid content. The birefringent optical fiber 4 has a preselected length determined by a range of pressures to be measured. The polarized light is injected into the birefringent fiber 4 in a direction parallel to its longitudinal axis. A second optical fiber 6 is also provided for receiving light signals emitted from the birefringent fiber 4. The light signals having an elliptical polarization state characterised by major and minor axes. Cross-talk between the light signal components along the polarization axes of the birefringent fiber is responsive to the ambient pressure in the environment. The measuring apparatus detects the light signals from the second optical fiber 6 to provide an output signal indicative of the ambient pressure.

The first optical fiber 2 has a first end 8 connected to the light source, and a second end connected to a first end of the birefringent fiber 4. The second optical fiber 6 has a first end connected to a second end of the birefringent fiber 4, and a second end 10 connected to the measuring apparatus. The second end of the first fiber 2 and the first end of the second fiber 6 are respectively fusion-spliced with the first and second ends of the birefringent optical fiber 4.

The birefringent device itself is assembled inside a high-pressure chamber 14 by means of a fiber-optic leadthrough system 12 which allows the passage of up to twenty separate optical fibers of any kind, exiting from the high-pressure chamber 14 and carrying optical output data signals from the birefringent fiber 4. The birefringent optical fiber 4 consists of a highly birefringent, polarization preserving fiber of predetermined length. this birefringent fiber 4 is fusion-spliced at its both ends with the first and second optical fibers 2 and 6 which are constituted of two single-mode fibers having the same diameter and cut off wavelength as the highly birefringent fiber 4. The first optical fiber 2 delivers appropriately polarized light to the birefringent fiber 4 while the second optical fiber 6 outputs optical signals to the measuring apparatus. To assure better mechanical protection and reliability of the device, the birefringent fiber 4 should be embedded in a hydrostatic liquid, then closed and hermetically sealed using a miniature nickel bellows 16. The whole assembly can then be inserted directly into a high pressure environment, autoclave or pipeline depending on the specific application by means of a Bridgman sealing system 17.

Figure 2:
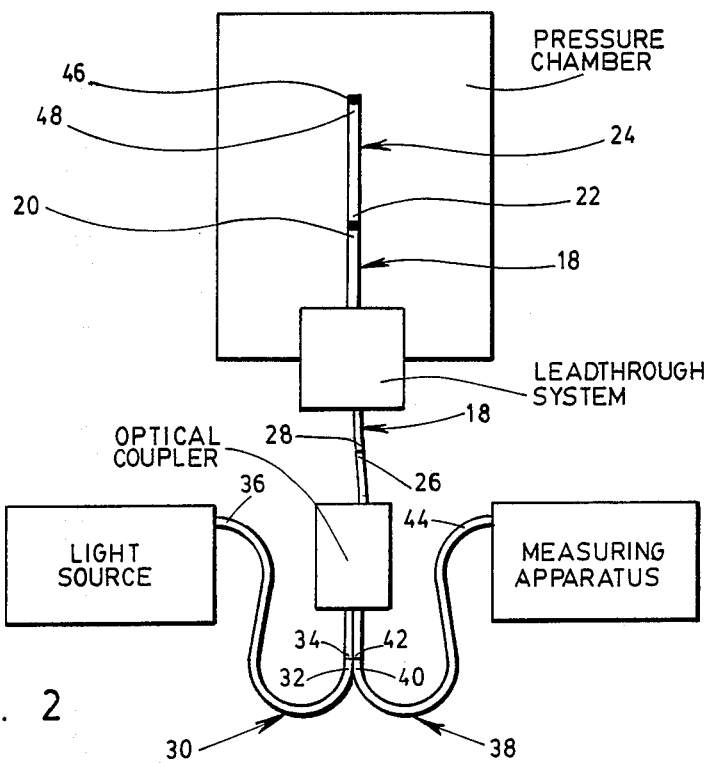
FIG. 2 is a schematic diagram partially in block diagram illustrating another birefringent optical fiber device according to the present invention.

Referring now to FIG. 2, there is shown another birefringent optical fiber device according to the present invention. This birefringent device comprises a first single-mode optical fiber 18 having a first end 20 connected to a first end 22 of a birefringent optical fiber 24, and a second end 28 connected to a first end 26 of an optical coupler. The device also comprises a second single-mode optical fiber 30 having a first end 32 connected to a second end 34 of the optical coupler, and a second end 36 connected to the light source; a third single-mode optical fiber 38 having a first end 40 connected to a third end 42 of the optical coupler, and a second end 44 connected to the measuring apparatus. The first, second and third optical fibers 18, 30 and 38 are connected to the optical coupler in such a manner that the birefringent fiber 24 can receive a polarized light from the light source, and the measuring apparatus can receive light signals emitting from the birefringent fiber 24. The first end 20 of the first optical fiber 18 is fusion-spliced with the first end 22 of the birefringent optical fiber 24. An optical mirror 46 is provided at a second end 48 of the birefringent optical fiber 24 so that light signals received at the first end 22 of the birefringent fiber 24 are transmitted over to the optical mirror 46 through the birefringent fiber 24, and reflected back to the first end 22 of the birefringent optical fiber 24. The first optical fiber 18 is inserted into the pressure chamber by means of a leadthrough system.

Figure 3:
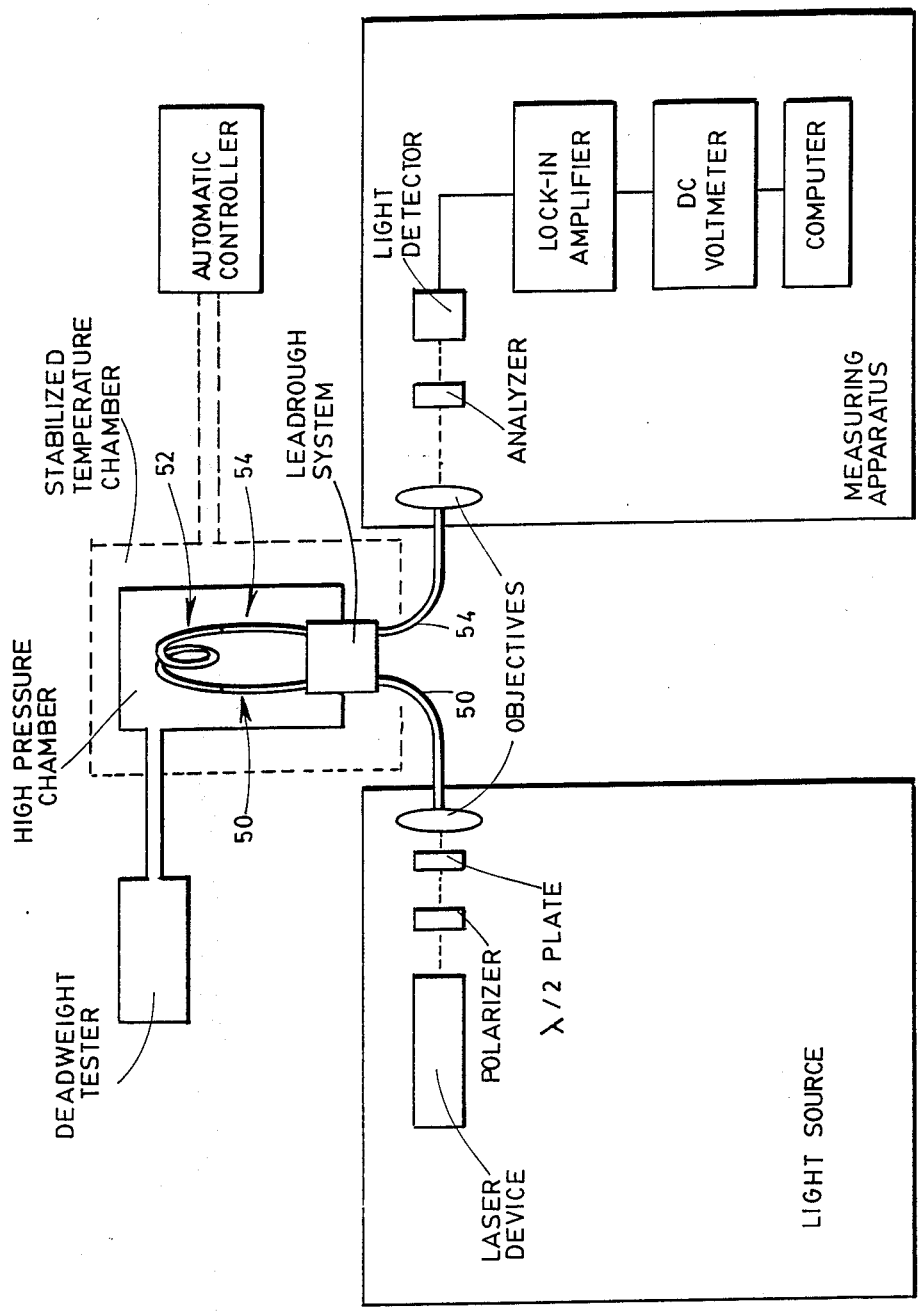
FIG. 3 shows an experimental set up including a block diagram illustrating a high pressure sensing system incorporating a birefringent optical fiber device according to the present invention.

Referring now to FIG. 3, there is shown an experimental set up including a high pressure sensing system incorporating a birefringent optical fiber device according to the present invention. The birefringent optical fiber device comprises a first single-mode optical fiber 50 having one of its ends connected to the light source, and its other end connected to the birefringent fiber 52. The birefringent optical fiber 52 has its other end connected to a second single-mode optical fiber 54. The first and second single-mode optical fibers 50 and 54 are inserted into a high pressure chamber by means of a leadthrough system. The pressure in the high pressure chamber is controlled by a deadweight tester. The high pressure chamber is placed inside a stabilized temperature external chamber, controlled by an automatic controller.

The light source comprises a laser device for projecting a light beam, a polarizer for polarizing the light beam into a polarized light, a half-wave plate for aligning the polarized light to a direction of about 45° with respect to the direction of one of the orthogonal axes of the birefringent fiber, and an objective for focussing the polarized light emitted from the half-wave plate into the first single-mode optical fiber 50.

The measuring apparatus comprises an objective for projecting the light signals received from the second signal-mode optical fiber 54, an analyzer for analyzing the light signals in a predetermined direction of polarization, and alight detector connected to the output of the analyzer for detecting a light signal component according to the predetermined direction, and providing an output signal which is sent respectively to a lock-in amplifier, a DC voltmeter, and a computer for further processing.

Preferably, the cross-talk between the orthogonal polarization axes of the birefringent fiber is of $-30db$. The preselected length is substantially between 1 mm and 20 cm, depending on range of pressure to be measured. The birefringent optical fiber can be a bow-tie birefringent optical fiber or an elliptical-core birefringent optical fiber. The predetermined direction of polarization of an analyser is preferably perpendicular to the major axis of an elliptical output polarization state. The birefringent optical fiber is a highly birefringent fiber.

EXPERIMENTAL RESULTS

The experimental set up shown in FIG. 3 is used to measure the influence of pressure and temperature on the output signal of the birefringent optical fiber device. This experimental set up measures the output signal of the birefringent fiber device as a function of high pressure up to 200 MPa. The birefringent fiber is placed inside a standard high-pressure chamber designed to sustain pressure up to 500 MPa. This high pressure chamber is thermally stabilized using the automatic controller with 0.01% accuracy of reading and range of operation from −15° C. to 150° C. A hardwood DWT-35 deadweight tester is used to generate and calibrate high pressures up to 105 MPa inside the high pressure chamber with a reading accuracy of 0.01%. For higher pressures, the deadweight tester could be disconnected and the high pressure chamber could be fed directly from a high-pressure pump equipped with a secondary Bourdon gauge.

Linearly polarized monochomatic light is launched into the input of the first single-mode fiber using appropriate coupling equipment. Adjustment for the 45° angle between the plane of polarization of injected light and the principal axes of the birefringent optical fiber is made by means of a half-wave plate. Any coherent light source producing a light having a wavelength adapted to single-mode operation of all the optical fibers involved could be used with this system. A modulated output signal is obtained by means of a standard chopper modulation for a HeNe laser at 632.8 nm and direct electronic modulation in the case of semiconductor laser. This set up includes a synchronous detection system composed of a silicon photodetector, polarization controllers, a lock-in amplifier and a computer-controlled digital DC voltmeter.

Measurement of output voltage characteristics as a function of high hydrostatic pressure and temperature were undertaken for two types of birefringent device using two different kinds of birefringent fibers. One type of birefringent fiber is made of York Bow-tie HB-600 or HB-800 highly birefringent fiber, having an external diameter of 125 mm, a beat length parameter $L_B = 1.7$ mm at 632.8 nm, a circular core and a cut off wave-length of 600 nm or 800 nm, respectively. The other type is prepared from elliptical-core (a/b = 3.1; b = 4 μm), birefringent optical fiber having an external diameter of 125 μm and a beat length parameter $L_B = 55$ mm.

Figure 4:
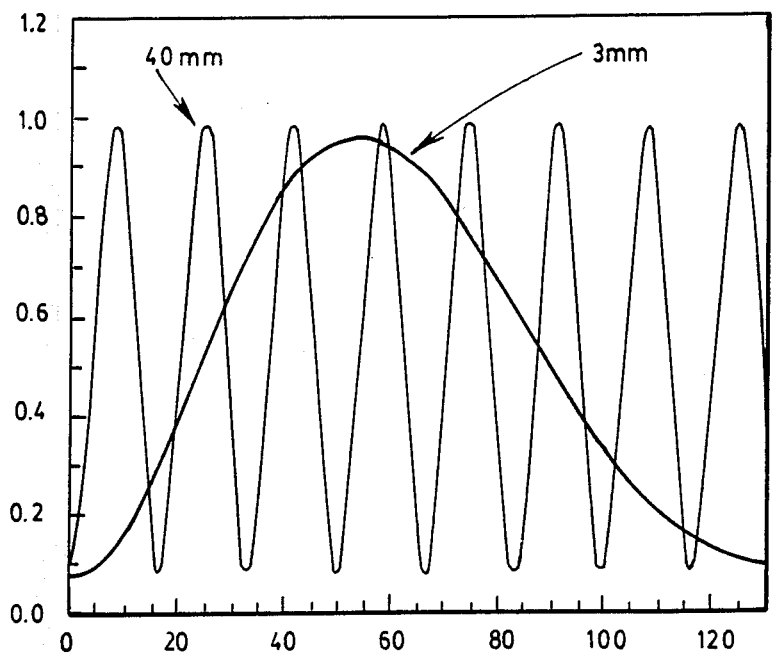
FIG. 4 is a diagram illustrating along its vertical axis a detected signal in arbitrary units of the birefringent device shown in FIG. 3 versus the ambient pressure in MPa for two lengths of a bow-tie birefringent optical fiber.
Figure 5:
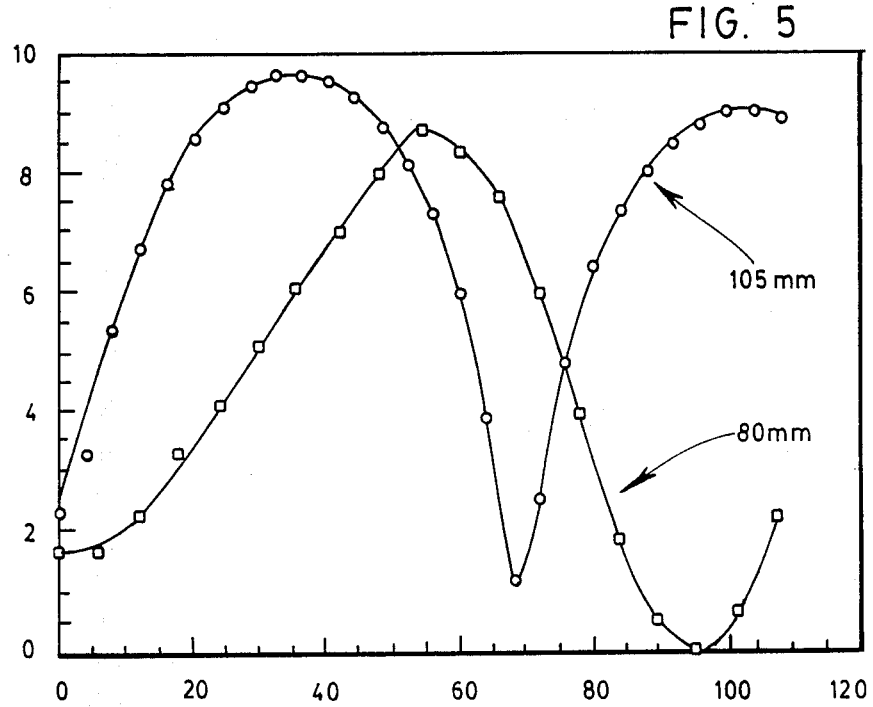
FIG. 5 is a diagram illustrating along its vertical axis a detected signal in arbitrary units of the birefringent device shown in FIG. 3 versus the ambient pressure in MPA for two lengths of an elliptical-core birefringent optical fiber.

The output signal of the birefringent device is found to be a periodic function of high hydrostatic pressure. This is true for both types of devices, as illustrated in FIGS. 4 and 5 for bow-tie and elliptical-core birefringent fibers. The two output signals shown in FIG. 4 are obtained from two birefringent fibers made of different lengths of HB-800 fiber (3 mm and 40 mm), while FIG. 5 shows similar output signals from two different lengths of elliptical-core fiber (80 mm and 105 mm).

Figure 6:
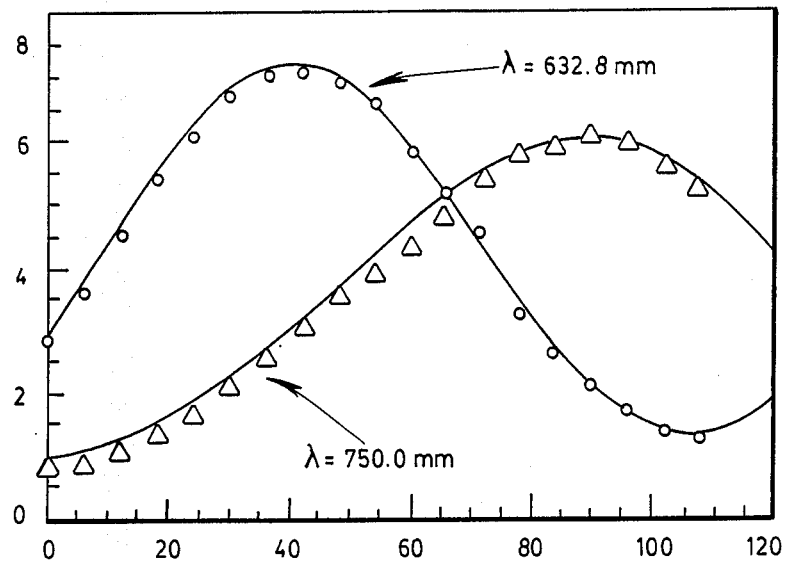
FIG. 6 is a diagram illustrating along its vertical axis a detected signal in arbitrary units of the birefringent device shown in FIG. 3 versus ambient pressure in MPa for a bow-tie birefringent optical fiber having a length of 3 mm, and using two different wavelengths of light launched into the birefringent fiber.

Another interesting effect is shown in FIG. 6 which illustrates two output signals obtained from a HB-600 birefringent fiber having a length of 3 mm, using two different light sources at λ = 750 nm and at λ = 632.8 nm.

Figure 7:
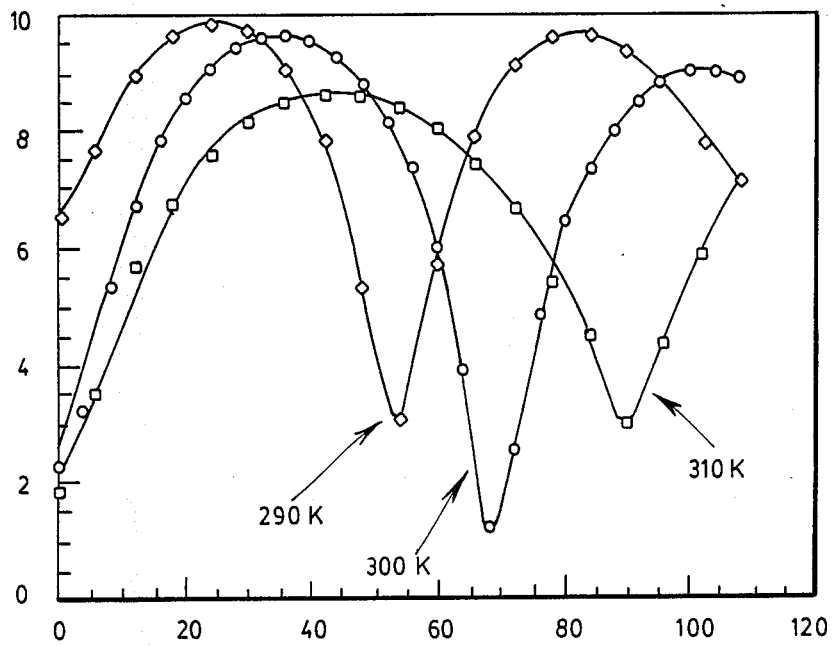
FIG. 7 is a diagram illustrating along its vertical axis a detected signal in arbitrary units of the birefringent device shown in FIG. 3 versus ambient pressure in MPa for an elliptical-core birefringent optical fiber according to three ambient temperatures.

It is generally agreed that polarization coupling in highly birefringent fibers is affected by external temperature. This effect causes a shift of the transducer output signal, as illustrated in FIG. 7 for an elliptical-core birefringent fiber.

Preliminary results of the above measurement of output characteristics clearly suggest several significant advantages of the present birefringent devices. In addition to the well known general advantages of fiber-optic sensors, the present device has much greater sensitivity than known high-pressure measuring instruments. What is particularly interesting is that the output sensitivity of the device can easily be adjusted for a specific pressure range through an appropriate choice of three parameters. These parameters are the length of the birefringent fiber, the beat length parameter of the optical fiber, and the wavelength of the light signal launched into the birefringent fiber.

The influence of the first parameter is evident in FIG. 4, where output signal (V) mean pressure sensitivity expressed as:

$$S = \Delta V / V_o \cdot \Delta p$$

varies from 1.35 MPa$^{-1}$ for a HB fiber with a length of 40 mm to 0.3 MPa$^{-1}$ for a 3 mm lenth. The measured phase sensitivity under pressure per unit length, is expressed as:

$$S_{ph} = 2\pi / T_p \cdot L$$

where L is the length of the fiber and $T_p$ is the pressure necessary to induce $2\pi$ phase shift of the output signal, is found to be dependent only on the type of fiber and the wavelength of light. As an example, for the HB-800 polarization preserving fiber, this value is determined as 9.6 rad/MPa·m at 632.8 nm and at 300 K.

Elliptical-core birefringent fibers demonstrate similar effects of increased sensitivity with increased length as depicted in FIG. 5. Compared with FIG. 4, the curves reflecting polarization coupling effects are nonsymmetrical due to the elliptically-shaped core of the birefringent optical fiber. Phase sensitivity per unit length is found to be 0.83 rd/MPa·m for this kind of fiber at 632.8 nm, which is about 12 times less than for a HB-800 bow-tie cylindrical core fiber. From a comparison of the beat length parameter of both fibers, it could be concluded that the pressure phase sensitivity per unit length increases a beat length decreases. In other words, the sensitivity of a polarimetric high pressure birefringent fiber would increase with an increased polarization maintaining ability of the birefringent fiber used as a sensing element in this birefringent fiber device.

Finally, the third factor to influence pressure sensitivity is the wavelength of the light launched into the birefringent fiber. The decrease of sensitivity with increasing wavelength can be seen from FIG. 6, it drops from $6.9 \cdot 10^{-2}$ MPa$^{-1}$ for λ = 632.8 nm to $3.8 \cdot 10^{-2}$ MPa$^{-2}$ for λ = 750 nm. Both characteristics shown in this figure were measured for a birefringent fiber made from a 3 mm length of bow-tie HB-600 fiber.

The temperature drift of the output pressure characteristics of the present birefringent device is illustrated in FIG. 7 for an elliptical-core fiber. Polarization coupling due to temperature variations, and consequently the shift of pressure characteristics, could significantly be diminished by using nylon-coated fibers or could be compensated for by using two equal lengths of birefringent fiber. Some combination of these two techniques could be applied to the present birefringent fiber device.

Although, the present invention has been explained hereinabove by way of a preferred embodiment thereof, it should be pointed out that any modifications to this preferred embodiment, within the scope of the appended claims is not deemed to change or alter the nature and scope of the present invention.

The embodiments of the invention in which an exclusive property or privilege is claimed are defined as follows:

1. Birefringent optical fiber device for measuring of ambient pressure in a stabilized temperature environment, when connected respectively to a light source and a measuring apparatus, comprising:

first means for receiving polarized light from said light source, and transmitting said polarized light;

a birefringent optical fiber having a solid content, said birefringent fiber being connected to said first means for receiving said polarized light which has light signal components polarized along two orthogonal polarization axes of said birefringent fiber, said birefringent optical fiber having a preselected length determined by a range of pressures to be measured, said polarized light being injected into said birefringent fiber in a direction parallel to a longitudinal axis of said birefringent fiber, said birefringent fiber being adapted to be submitted to said environment; and second means for receiving light signals emitted from said birefringent fiber, said light signals having an elliptical polarization state characterized by major and minor axes, whereby cross-talk between said light signal components along said polarization axes being responsive to said ambient pressure in said environment, said measuring apparatus detecting said light signals from said second means to provide an output signal indicative of said ambient pressure.

2. Birefringent optical fiber device according to claim 1, wherein said first means is a first optical fiber having a first end connected to said light source, and a second end connected to a first end of said birefringent fiber; wherein said second means is a second optical fiber having a first end connected to a second end of said birefringent fiber, and a second end connected to said measuring apparatus; and wherein said second end of said first fiber and said first end of said second fiber being respectively fusion-spliced with said first and second ends of said birefringent optical fiber.

3. Birefringent optical fiber device according to claim 2, in combination with said measuring apparatus and said light source, wherein:
said light source comprises:
a laser device for projecting a light beam;
a polarizer for polarizing said light beam into said polarized light;
a half wave plate for aligning said polarized light emitted from said polarizer to a direction of about 45° with respect to a direction of one of said orthogonal axes of said birefringent fiber; and
external lens means for focussing said polarized light emitted from said half wave plate into said first end of said first optical fiber;
said measuring apparatus comprises:
a lens for projecting said light signals received from said second end of said second optical fiber;
an analyser for analysing said light signals in a predetermined direction of polarization; and
a light detector connected to an output of said analyser for detecting a light signal component according to said predetermined direction, and providing said output signal;
said first and second optical fibers are single mode fibers.

4. Birefringent optical fiber device according to claim 1, wherein:
said first and second means are constituted of:
a first optical fiber having a first end connected to a first end of said birefringment optical fiber; an optical coupler having a first end connected to a second end of said first optical fiber; a second optical fiber having a first end connected to a second end of said optical coupler, and a second end connected to said light source; and
a third optical fiber having a first end connected to a third end of said optical coupler, and a second end connected to said measuring apparatus; said first, second and third optical fibers being connected to said optical coupler in such a manner that said birefringent fiber can receive said polarized light from said light source, and said measuring apparatus can receive said light signals emitted from said birefringent fiber;

said first end of said first optical fiber is fusion-spliced with said first end of said birefringent optical fiber; and an optical mirror is provided at a second end of said birefringent optical fiber so that light signals received at said first end of said birefringent optical fiber are transmitted over to said optical mirror through said birefringent fiber, and reflected back to said first end of said birefringent optical fiber.

5. Birefringent optical fiber device according to claim 4, in combination with said measuring apparatus and said light source, wherein:
said light source comprises:
a laser device for projecting a light beam; a polarizer for polarizing said light beam into said polarized light; a half wave plate for aligning said polarized light emitted from said polarizer to a direction of about 45° with respect to a direction of one of said orthogonal axes of said birefringent fiber; and
external lens means for focussing said polarized light emitted from said half wave plate into said second end of said second optical fiber;
said measuring apparatus comprises: a lens for projecting said light signals emitted from said second end of said third optical fiber;
an analyser for analysing said light signals in a predetermined direction of polarization; and
a light detector connected to an output of said analyser for detecting a light signal component according to said predetermined direction, and providing said output signal;
said first, second and third optical fibers are single mode fibers.

6. Birefringent optical fiber device according to claim 1, 3 or 5, wherein said cross-talk between said orthogonal polarization axes is of −30db.

7. Birefringent optical fiber device according to claim 1, 3 or 5, wherein said preselected length is substantially between 1 mm to 20 cm.

8. Birefringent optical fiber device according to claim 1, 3 or 5, wherein said birefringent optical fiber is a bow-tie birefringent optical fiber.

9. Birefringent optical fiber device according to claim 1, 3 or 5, wherein said birefringent optical fiber is an elliptical-core birefringent optical fiber.

10. Birefringent optical fiber device according to claim 1, 3 or 5, wherein said birefringent optical fiber is a highly birefringent fiber.

11. Birefringent optical fiber device according to claim 3 or 5, wherein said predetermined direction of polarization is perpendicular to said major axis.

* * * * *